(12) United States Patent
Morrow et al.

(10) Patent No.: US 7,552,283 B2
(45) Date of Patent: Jun. 23, 2009

(54) EFFICIENT MEMORY HIERARCHY MANAGEMENT

(75) Inventors: Michael William Morrow, Cary, NC (US); Thomas Andrew Sartorius, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 139 days.

(21) Appl. No.: 11/336,282

(22) Filed: Jan. 20, 2006

(65) Prior Publication Data

US 2007/0174553 A1   Jul. 26, 2007

(51) Int. Cl.
G06F 13/00 (2006.01)
(52) U.S. Cl. .................. 711/123; 711/125; 711/126
(58) Field of Classification Search ............. 711/202, 711/203, 204, 205, 206, 207, 208, 209, 213, 711/214, 215, 123
See application file for complete search history.

(56) References Cited

U.S. PATENT DOCUMENTS

| | | | | |
|---|---|---|---|---|
| 4,719,568 A | * | 1/1988 | Carrubba et al. | 711/123 |
| 5,377,336 A | * | 12/1994 | Eickemeyer et al. | 712/207 |
| 5,737,749 A | | 4/1998 | Patel | |
| 2002/0010837 A1 | | 1/2002 | Fujinami | |
| 2002/0013892 A1 | * | 1/2002 | Gorishek et al. | 712/227 |
| 2006/0004942 A1 | * | 1/2006 | Hetherington et al. | 711/3 |

FOREIGN PATENT DOCUMENTS

GB    2426082    11/2006

OTHER PUBLICATIONS

International Preliminary Report on Patentability-PCT/US07/060815, the International Bureau of WIPO, Geneva Switzerland-Jul. 22, 2008.
International Search Report-PCT/US07/060815, International Search Authority-European Patent Office-Aug. 2, 2007.
Written Opinion-PCT/US07/060815, International Search Authority-European Patent Office-Aug. 2, 2007.

* cited by examiner

*Primary Examiner*—Hyung S Sough
*Assistant Examiner*—Mardochee Chery
(74) *Attorney, Agent, or Firm*—Peter M. Kamarchik; Nicholas J. Pauley

(57) ABSTRACT

In a processor, there are situations where instructions and some parts of a program may reside in a data cache prior to execution of the program. Hardware and software techniques are provided for fetching an instruction in the data cache after having a miss in an instruction cache to improve the processor's performance. If an instruction is not present in the instruction cache, an instruction fetch address is sent as a data fetch address to the data cache. If there is valid data present in the data cache at the supplied instruction fetch address, the data actually is an instruction and the data cache entry is fetched and supplied as an instruction to the processor complex. An additional bit may be included in an instruction page table to indicate on a miss in the instruction cache that the data cache should be checked for the instruction.

20 Claims, 6 Drawing Sheets

EFFICIENT MEMORY HIERARCHY MANAGEMENT

FIELD

The present disclosure relates generally to techniques for fetching instructions from memory having an instruction cache and a data cache and, more specifically, to an improved approach for fetching an instruction after a miss in the instruction cache by directly fetching the instruction from the data cache if the instruction resides there.

BACKGROUND

Commonly portable products, such as cell phones, laptop computers, personal data assistants (PDAs) or the like, require the use of a processor executing programs, such as, communication and multimedia programs. The processing system for such products includes a processor and memory complex for storing instructions and data. For example, the instructions and data may be stored in a hierarchical memory consisting of multi-levels of caches, including, for example, an instruction cache, a data cache, and a system memory. The use of a separate instruction cache and a separate data cache is known as a Harvard architecture. Since the Harvard architecture isolates the instruction cache from the data cache, problems may arise when instructions are stored in the data cache.

In general system processing with a Harvard architecture, there are situations which arise in which instructions may be stored in the data cache. For example, if a program is encrypted or in a compressed form, it must be decrypted/decompressed prior to enabling the program to run. The decryption/decompression process treats the encrypted/compressed program as data in order to process it and stores the decrypted/decompressed instructions as data in a data cache, for example, a level 1 data cache, on its way to system memory. The generation of instructions from Java byte codes is another situation in which instructions are initially treated as data that are stored using the data path, including the data cache, to the system memory. The initial state of a program in which program instructions are being treated as data creates a coherence problem within the memory hierarchy, since at least some parts of a program may reside in the data cache prior to execution of the program.

In order to resolve the coherence problem, a software approach is typically taken wherein the program or program segments in the data cache are moved to system memory under program control, the instruction cache is typically invalidated to clean the cache of any old program segments, and the instructions comprising the program are then fetched from the system memory. The movement of the instructions from the data cache to system memory and the fetching of the instructions from system memory prior to execution may take several cycles, reducing the processor's performance due to processing time overhead that must occur to access instructions initially residing on the data cache prior to the program running on the processor.

SUMMARY

Among its several aspects, the present disclosure recognizes that the overhead of dealing with instructions in a data cache may be limiting the performance of the processor and possibly limiting the quality of service that may be achieved. The present disclosure also recognizes that it may be desirable to access instructions that are residing in a data cache.

Moreover, the present disclosure describes apparatus, methods, and computer readable medium for directly fetching an instruction from a data cache when that instruction was not found in the instruction cache, an instruction cache miss, and the instruction is determined to be in the data cache. By fetching the instruction directly from the data cache, after an instruction cache miss, the processor performance may be improved.

To such ends, an embodiment of the present invention includes a method of finding an instruction in a data cache that is separate from an instruction cache. In such a method, it is determined that a fetch attempt missed in the instruction cache for the instruction at an instruction fetch address. The instruction fetch address is transformed to a data fetch address. Further, a fetch attempt in the data cache is made for the instruction at the transformed data fetch address.

Another embodiment of the invention addresses a processor complex for fetching instructions. The processor complex may suitably include an instruction cache, a data cache, and a first selector. The first selector is used to select an instruction fetch address or a data fetch address. The selected fetch address is applied to a data cache whereby instructions or data may be selectively fetched from the data cache.

A more complete understanding of the present inventive concepts disclosed herein, as well as other features, will be apparent from the following Detailed Description and the accompanying drawings.

DETAILED DESCRIPTION

Inventive aspects of the present disclosure will be illustrated more fully with reference to the accompanying drawings, in which several embodiments of the disclosure are shown. The embodiment of this invention may, however, be embodied in various forms and should not be construed as limited to the embodiments set forth herein. Rather, these embodiments are provided so that this disclosure will be thorough and complete, and will fully convey the scope of the disclosure to those skilled in the art.

It will be appreciated that the present disclosure may be embodied as methods, systems, or computer program products. Accordingly, the present inventive concepts disclosed herein may take the form of a hardware embodiment, a software embodiment or an embodiment combining software and hardware aspects. Furthermore, the present inventive concepts disclosed herein may take the form of a computer program product on a computer-usable storage medium having computer-usable program code embodied in the medium. Any suitable computer readable medium may be utilized including hard disks, CD-ROMs, optical storage devices, flash memories, or magnetic storage devices.

Computer program code which may be compiled, assembled, and loaded to a processor may be initially written in a programming language such as C, C++, native Assembler, JAVA®, Smalltalk, JavaScript®, Visual Basic®, TSQL, Perl, or in various other programming languages in accordance with the teachings of the present disclosure. Program code or computer readable medium refers to machine language code such as object code whose format is understandable by a processor. Software embodiments of the disclosure do not depend upon their implementation with a particular programming language. When program code is executed, a new task which defines the operating environment for the program code is created.

Figure 1:
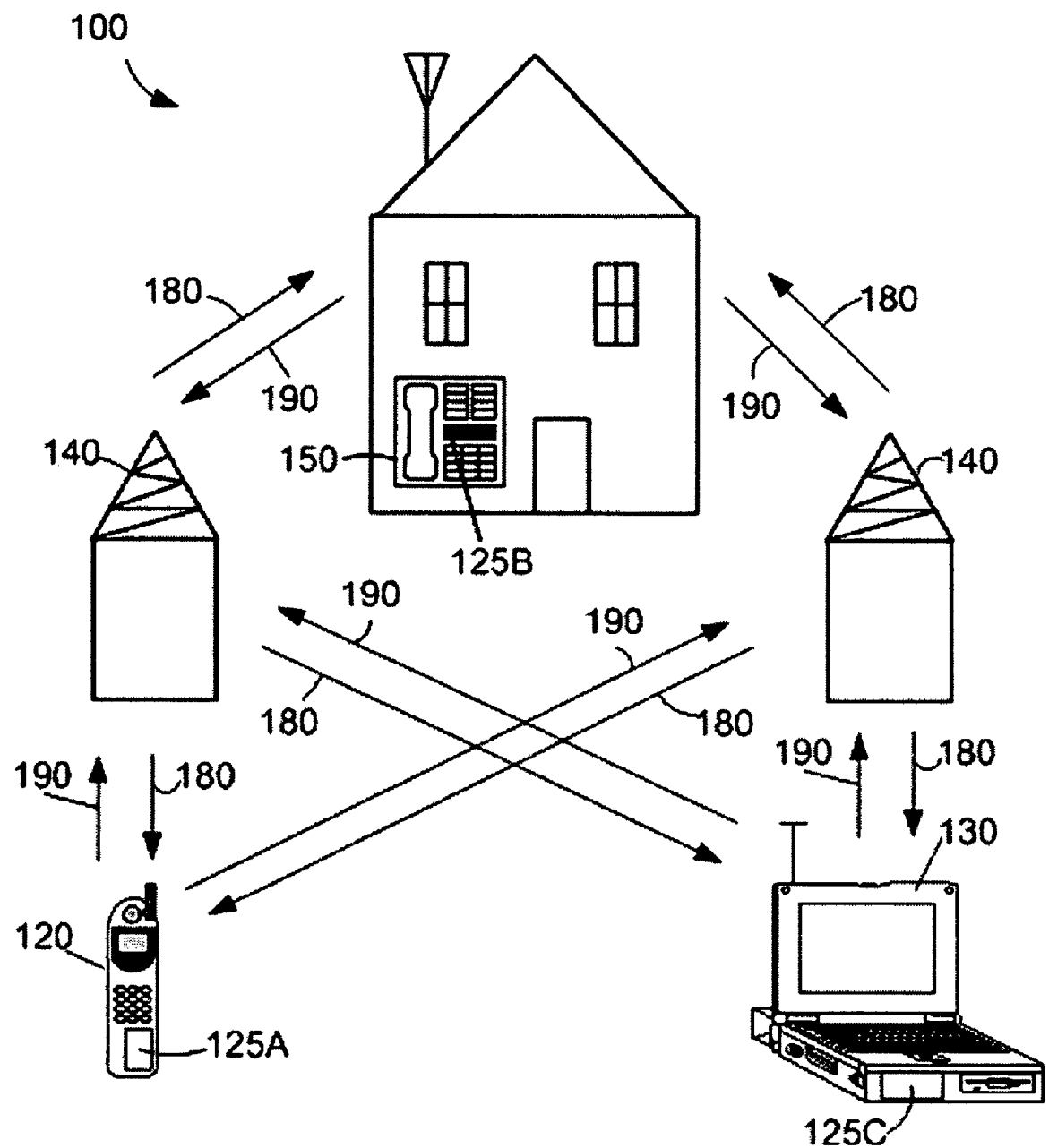
FIG. 1 is a block diagram of an exemplary wireless communication system in which an embodiment of the disclosure may be employed.

FIG. 1 shows an exemplary wireless communication system 100 in which an embodiment of the disclosure may be employed. For purposes of illustration, FIG. 1 shows three remote units 120, 130, and 150 and two base stations 140. It will be recognized that typical wireless communication systems may have remote units and base stations. Remote units 120, 130, and 150 include hardware components, software components, or both as represented by components 125A, 125C, and 125B, respectively, which have been adapted to embody the disclosure as discussed further below. FIG. 1 shows forward link signals 180 from the base stations 140 to the remote units 120, 130, and 150 and reverse link signals 190 from the remote units 120, 130, and 150 to base stations 140.

In FIG. 1, remote unit 120 is shown as a mobile telephone, remote unit 130 is shown as a portable computer, and remote unit 150 is shown as a fixed location remote unit in a wireless local loop system. For example, the remote units may be cell phones, handheld personal communication systems (PCS) units, portable data units such as personal data assistants, or fixed location data units such as meter reading equipment. Although FIG. 1 illustrates remote units according to the teachings of the disclosure, the disclosure is not limited to these exemplary illustrated units. The disclosure may be suitably employed in any device having a processor with an instruction cache, a data cache, and a system memory.

Figure 2:
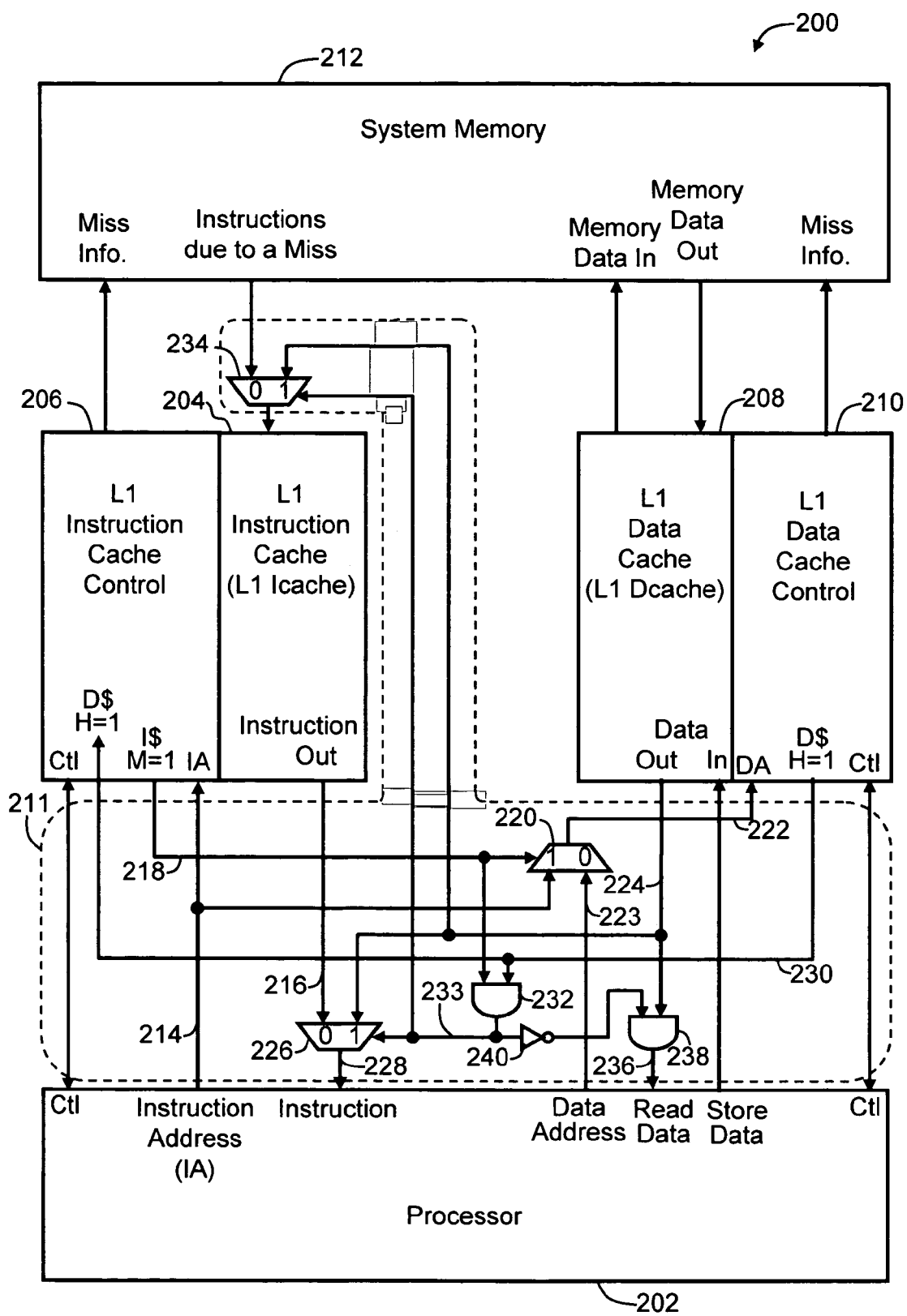
FIG. 2 is a functional block diagram of a processor and memory complex in which data cache operation is adapted for memory efficient operations of instruction fetching in accordance with an embodiment of the present invention.

FIG. 2 is a functional block diagram of a processor and memory complex 200 in which normal data cache operation is adapted for more efficient instruction fetching as described further herein. The processor and memory complex 200 includes a processor 202, a level 1 (L1) instruction cache 204, an L1 instruction cache control unit 206, an L1 data cache 208, an L1 data cache control unit 210, a control section 211, and a system memory 212. The L1 instruction cache control unit 206 may include an instruction content addressable memory for instruction tag matching, as may be used in a set associative cache. The control section 211 includes multiplexing elements 220, 226, and 234, gating devices 232 and 238, and an inverter 240. Peripheral devices, which may connect to the processor complex, are not shown for clarity of discussion of the present disclosure. The processor and memory complex 200 may be suitably employed in components 125A-C for executing program code that is stored in the system memory 212.

In order to fetch an instruction in the processor and memory complex 200, the processor 202 generates an instruction fetch address (IA) 214 of the desired instruction and sends the instruction fetch address to the L1 instruction cache control unit 206. The L1 instruction cache control unit 206 checks to see if the instruction is present in the L1 instruction cache 204. This check is accomplished, for example, through the use of an internal content addressable memory (CAM) in an associative search for a match to the supplied instruction fetch address. When the instruction is present, a match occurs and the L1 instruction cache control unit 206 indicates that the instruction is present in the instruction cache 204. If the instruction is not present, no match will be found in the CAM associative search and the L1 instruction cache control unit 206 indicates that the instruction is not present in the instruction cache 204.

If the instruction is present, the instruction at the instruction fetch address is selected from the instruction cache 204. The instruction is then sent on instruction out bus 216 through the multiplexing element 226 to the processor 202.

If the instruction is not present in the instruction cache, an instruction cache miss signal (I$M=1) 218 is set active indicating a miss has occurred. Upon detecting a miss in the instruction cache, the processor and memory complex 200 attempts to fetch the desired instruction from the L1 data cache 208. To this end, multiplexing element 220 is enabled by the miss signal (I$M=1) 218 to select the instruction fetch address 214. The instruction fetch address 214 then passes through a multiplexing element 220 onto a Daddress bus 222 and is sent to the L1 data cache control unit 210 as a data fetch address. It is noted that the processor and memory complex 200 represents a logical view of the system, since, for example, the application of the instruction fetch address 214 onto the Daddress bus 222 may require an arbitration or a waiting period before access to the Daddress bus 222 may be obtained. The approach taken to multiplex the instruction fetch address 214 with the processor generated data address 223 may be varied and is dependent upon the particular approach taken in the instruction cache and data cache designs.

The L1 data cache control unit 210 checks to see if there is a hit in the L1 data cache 208 at the supplied instruction fetch address, through an internal associative search, for example, on the supplied instruction fetch address. A hit indicates there is data present at the supplied instruction fetch address. This data is actually an instruction and the data cache entry is fetched from the L1 data cache 208 and placed on the data out bus 224. In order to supply the data fetched from the L1 data cache 208 as an instruction to the processor, a multiplexing element 226 may be suitably employed. The data out bus 224 is selected by multiplexing element 226 placing the data fetched from the data cache onto the processor's instruction bus 228, when there is a miss in the instruction cache followed by a hit in the data cache at the instruction fetch address. The occurrence of the miss in the instruction cache, indicated by miss signal (I$M=1) 218 being active high, followed by the hit in the data cache at the same instruction fetch address, indicated by hit signal (D$H=1) 230 being active high, is logically represented by AND gate 232. The output of AND gate 232 is the selection signal 233 for the multiplexing element 226. The instruction found in the data cache is also multiplexed for loading into the instruction cache 204 by multiplexing element 234 using the selection signal 233 logically provided by AND gate 232. While the data out bus 224 is forwarding the instruction to the processor, the processor's read data input 236 is deactivated by AND gate 238 using the inverter 240 to provide an inverse of the selection signal 233.

If it was determined there was a miss in the data cache at the supplied instruction fetch address, the instruction is not in the data cache and the instruction is fetched from the system memory 212. The hit signal (D$H=1) 230 is also sent to the L1 instruction cache control unit 206 to indicate by its inactive state that a miss occurred on the attempt to locate the instruction in the data cache 208. Note that other signaling means may be used to indicate that a miss occurred on the attempt to locate the instruction in the data cache 208. Since the instruction is not in the instruction cache 204 and not in the data cache 208 it must be fetched from the system memory 212. Once the instruction is obtained from the system memory 212 it is sent to the processor 202. Note, the paths from the system memory for supplying an instruction due to a miss in the instruction cache or data cache and for supplying data due to a miss in the data cache are not shown in order to clearly illustrate the present disclosure.

Figure 3:
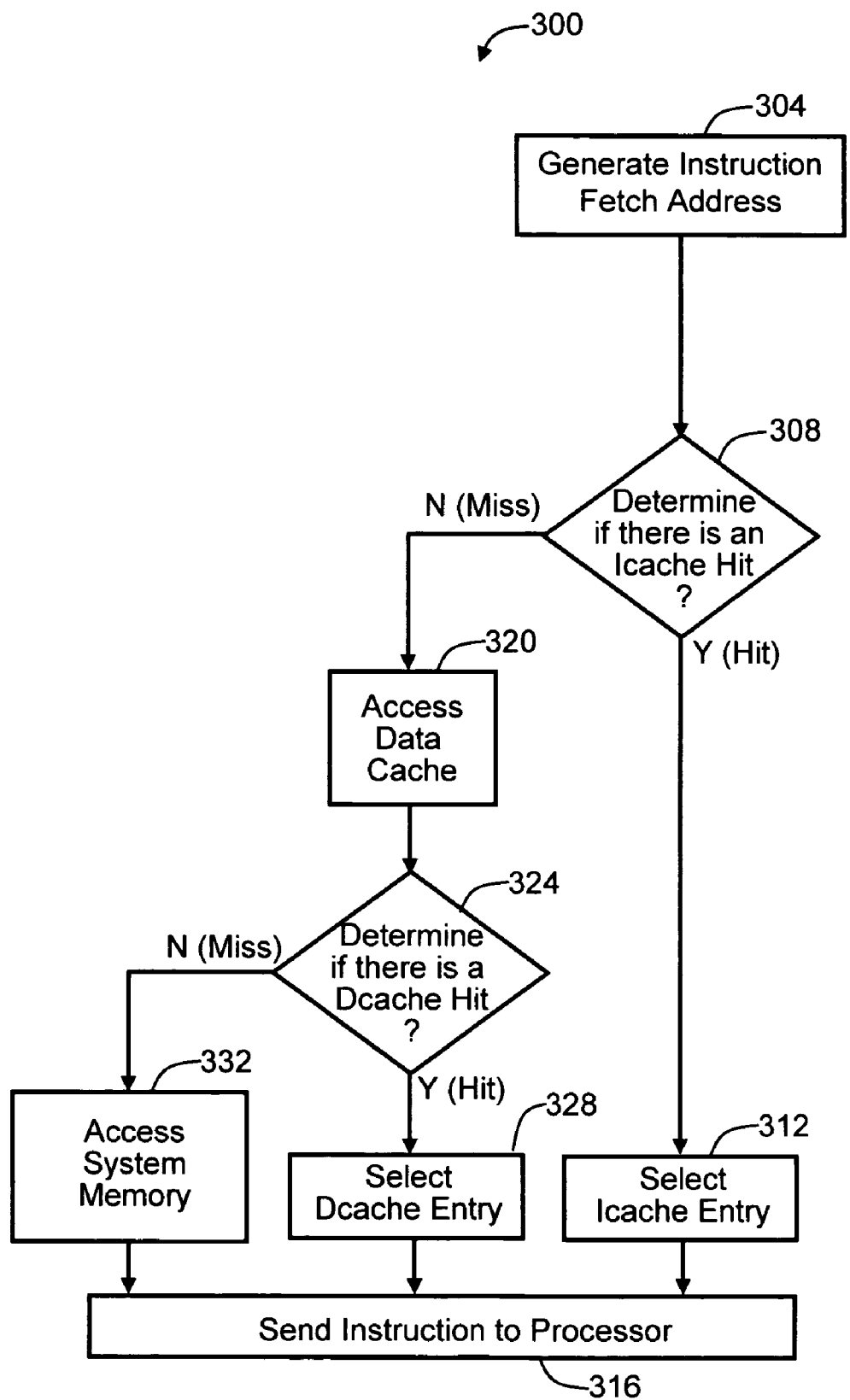
FIG. 3 is a flow chart of an exemplary method for fetching an instruction stored in a data cache, in order to reduce the miss handling overhead associated with the instruction initially stored as data in the data cache in accordance with the present disclosure.

FIG. 3 is an exemplary flow chart of a method 300 for directly fetching an instruction in a data cache after having a miss in the instruction cache, in order to minimize the overhead commonly associated with handling the instruction initially stored as data in the data cache. Exemplary relationships between the steps of FIG. 3 and the elements of FIG. 2 are indicated by describing how elements from the processor and memory complex 200 may suitably cooperate to perform the steps of method 300.

In order to fetch an instruction, an instruction fetch address is generated in step 304. For example, a processor, such as the processor 202, generates an instruction fetch address of the desired instruction and sends the instruction fetch address 214 to the L1 instruction cache controller 206. In step 308, it is determined whether there is an instruction cache hit or a miss. For example, the L1 instruction cache controller 206 checks to see if the instruction is present in the instruction cache 204. If the instruction is present, its presence is indicated as a hit. If the instruction is present, the method 300 proceeds to step 312 and the instruction at the instruction fetch address is selected. In step 316, the instruction is sent to the processor. For example, the selected instruction is placed on instruction out bus 216 and sent to the processor 202 through multiplexing element 226.

If the instruction is not present in the instruction cache as determined in step 308, an indication is given that a miss has occurred and an attempt is made to fetch the instruction from the data cache in step 320. For example, the instruction fetch address 214 is sent through multiplexing element 220 as a data fetch address 222 to the data cache 208. In step 324, a check is made, for example, by the L1 data cache controller 210 to see if there is valid data present at the supplied instruction fetch address. If there is valid data present in the data cache at the supplied instruction fetch address, the data actually is an instruction and the data cache entry is fetched in step 328. In step 316, the data fetched from the data cache is sent as an instruction to the processor. For example, the data fetched on data out bus 224 from the data cache 208 is sent through multiplexing element 226 and supplied as an instruction to the processor 202 on instruction bus 228.

In step 324, if there was a miss in the data cache at the supplied instruction fetch address, the instruction is not in the data cache and in step 332 the instruction is fetched from the system memory. For example, the data cache hit signal D$H=1 230 is sent to the L1 instruction cache control unit 206 to indicate by its inactive state that a miss occurred on the attempt to locate the instruction in the data cache 208. Since the instruction is not in the instruction cache 204 and not in the data cache 208 it must be fetched from the system memory 212. Once the instruction is obtained from the system memory 212, the instruction is sent to the processor 202, as indicated in step 316.

Figure 4:
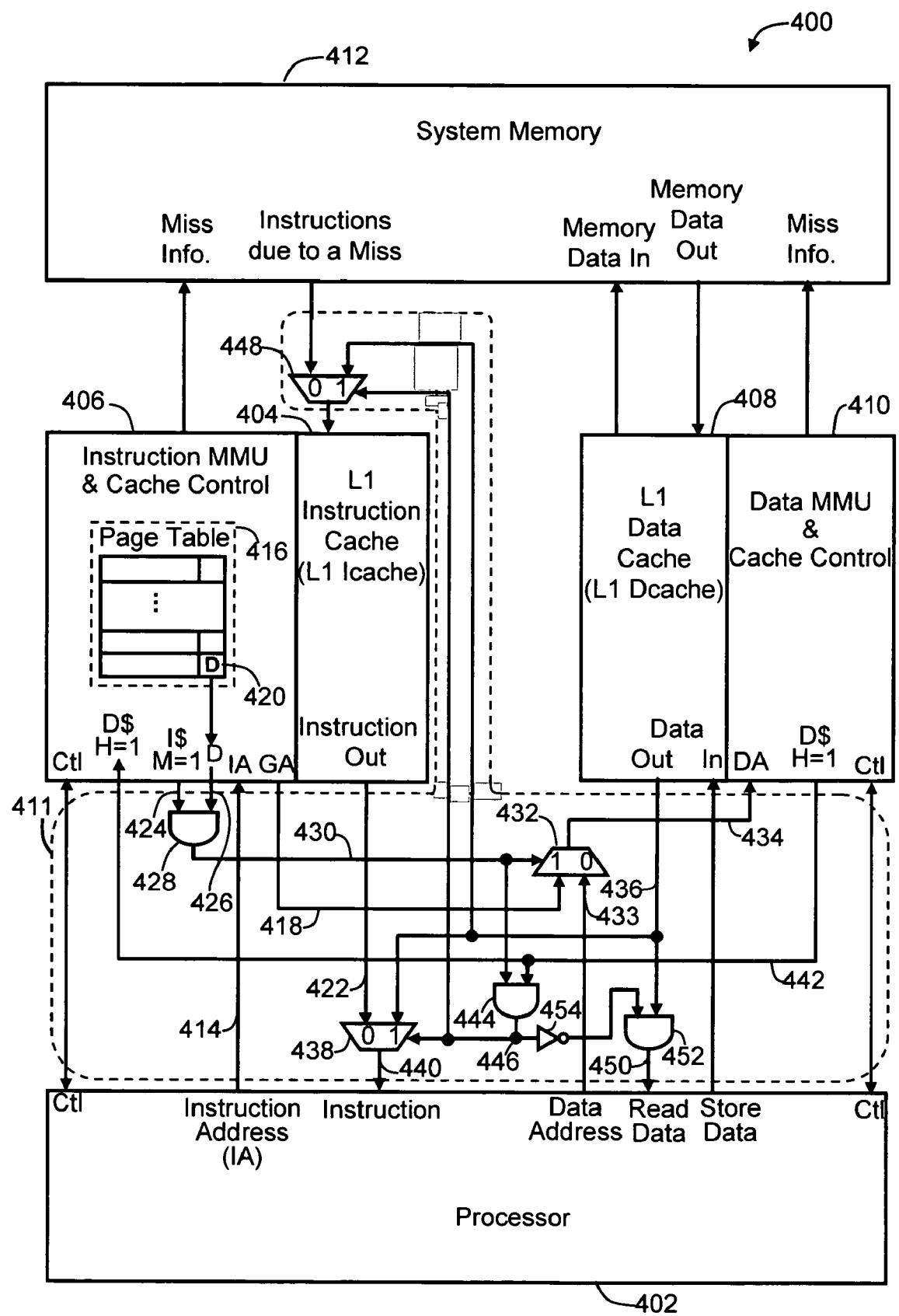
FIG. 4 is a functional block diagram of a processor and memory complex which includes an instruction page table in which data cache operation is adapted for efficient instruction fetching in accordance with the present disclosure.

FIG. 4 is a functional block diagram of a processor and memory complex 400 which includes an instruction page table in which normal data cache operation is adapted for efficient operation of instruction fetching in accordance with the present disclosure. The processor and memory complex 400 includes a processor 402, a level 1 (L1) instruction cache 404, an instruction memory management unit (IMMU) and cache control (IMMU/$Control) 406, an L1 data cache 408, a data memory management unit (DMMU) and cache control (DMMU/$Control) 410, a control section 411, and a memory hierarchy 412. The IMMU/$Control 406 may include, for example, a virtual-to-physical instruction address translation process. The control section 411 includes multiplexing elements 432, 438, and 448, gating devices 428, 444, and 452, and an inverter 454. Peripheral devices, which may connect to the processor complex, are not shown for clarity of discussion of the present disclosure. The processor and memory complex 400 may be suitably employed in components 125A-C for executing program code that is stored in the system memory 412.

The instruction cache may use a translation look aside buffer (TLB) that contains an instruction page table in order to improve the instruction cache's performance. The instruction page table having, for example, a list of physical page numbers associated with virtual page numbers and additional information associated with each page number entry. An instruction page table entry is created when a page of memory in the instruction address range is loaded in the instruction cache or the data cache. The loading of a page of memory may occur under the supervision of an operating system (OS). In operation, the instruction page table is examined for a match with a virtual page number supplied to the TLB. While a TLB having an instruction page table is described herein as a part of the instruction MMU and cache control 406, it will be recognized that alternative approaches may be used.

In order to fetch an instruction in the processor and memory complex 400, the processor 402 generates an instruction fetch address (IA) 414 for the desired instruction and sends the instruction fetch address to the IMMU/$Control 406. An appropriate entry in an instruction page table, such as page table 416 located in the IMMU/$Control 406, is selected based on a supplied page number that is part of the IA 414. The instruction address based on the selected page table entry is combined with a page address, also part of the IA 414, generating an instruction address (GA) 418 that is applied internally to the L1 instruction cache 404. The entry selected from the page table 416 includes additional information stored with that entry. One of the additional bits of information that may be stored with each page table entry is a check data cache attribute, labeled as D bit 420.

The D bit is set to a "1" when the entry in the instruction page table is created due to loading a page of instructions into the data cache or when generating instructions that are stored in a page in the data cache during processing. The D bit is typically set by the operating system (OS) to indicate that a page's contents may be used as both data and instructions. In an exemplary scenario, a program, generating data that will be used as instructions, calls the OS to request that the appropriate pages be marked by setting the D bit in the associated page table entries. In another scenario, a program may also request pages from the OS that are already set up with the D bit set. The D bit does not necessarily need to be explicitly cleared. If a program specifies that the data cache may contain instructions by causing the appropriate D bit or D bits to be set, then that specification may be valid through the life of the program. The D bit or D bits may then later be cleared when the page table is used for a different process.

The IMMU/$Control 406 checks to see if the instruction is present in the instruction cache 404. If the instruction is present, this presence is indicated as a hit. If the instruction is present, the instruction at the instruction fetch address is selected from the instruction cache 404. The instruction is then sent on instruction out bus 422 through multiplexing element 438 to the processor 402. If the instruction is not present, an indication is given by the IMMU/$Control 406 that a miss has occurred and an instruction cache miss signal (I$M=1) 424 is set active indicating a miss has occurred.

Upon detecting a miss in the instruction cache in conjunction with the selected D bit being set to a "1", the processor and memory complex 400 attempts to fetch the desired instruction from the L1 data cache 408. This attempt may suitably be accomplished, for example, by using the selected D bit in a gating function. The D bit 420 from the selected page table entry is output as D bit signal 426. The D bit signals 426 is, for example, ANDed, by AND gate 428, with the miss indication (I$M=1) 424. The AND gate 428 output 430 is then used by multiplexing element 432 to select the generated instruction address (GA) 418 or a data address 433 from the processor 402. When selected, the GA 418 passes through multiplexing element 432 onto Daddress bus (DA) 434 and is sent to the data MMU and cache control 410 to determine if the instruction resides in the data cache 408 at the data fetch address. It is noted that the processor and memory complex 400 represents a logical view of the system, since, for example, the application of the generated instruction address 418 onto the Daddress bus 434 may require an arbitration or a waiting period before access to the Daddress bus 434 may be obtained. The approach taken to multiplex the generated instruction address 418 with the processor generated data address 433 may be varied and is dependent upon the particular approach taken in the instruction cache and data cache designs.

The data cache then checks to see if there is valid data present at the supplied instruction fetch address. If there is valid data present at the supplied instruction fetch address, the data actually is an instruction and the data cache entry is fetched from the L1 data cache 408 and placed on the data out bus 436. In order to supply the data cache entry as an instruction to the processor, a multiplexing element 438 is used, for example. The multiplexing element 438 is enabled to pass the data out bus 436 onto the processor's instruction bus 440 when there is a miss in the instruction cache and the selected D bit is set to a "1" followed by a hit in the data cache at the instruction fetch address. The occurrence of the miss in the instruction cache, indicated by miss signal (I$M=1) 424 being active high, and the D bit signal 426 set to a "1", followed by the hit in the data cache at the generated instruction address, indicated by hit signal (D$H=1) 442 being active high, is logically represented by AND gate 444. The AND gate 444 output is the selection signal 446 for the multiplexing element 438. The instruction on the data out bus is also multiplexed for loading into the instruction cache by multiplexing element 448 using the selection signal 446. While the L1 data cache data out bus 436 is forwarding the instruction to the processor 402, the data out bus 436 is gated off for transfers to the processor's read data input 450 by AND gate 452 using an inverse of the selection signal 446 provided by the inverter 454.

If it was determined there was a miss in the data cache at the supplied instruction fetch address, the instruction is not in the data cache and the instruction is fetched from the system memory 412. The hit signal (D$H=1) 442 is also sent to the IMMU/$Control 406 to indicate by its inactive state that a miss occurred on the attempt to locate the instruction in the data cache 408. Once the instruction is obtained from the system memory 412, it is sent to the processor 402. Note the paths from the memory hierarchy for supplying an instruction due to a miss in the instruction cache or data cache and for supplying data due to a miss in the data cache are not shown, but any of a wide variety of connection approaches may be employed consistent with the application and the processor employed.

Figure 5:
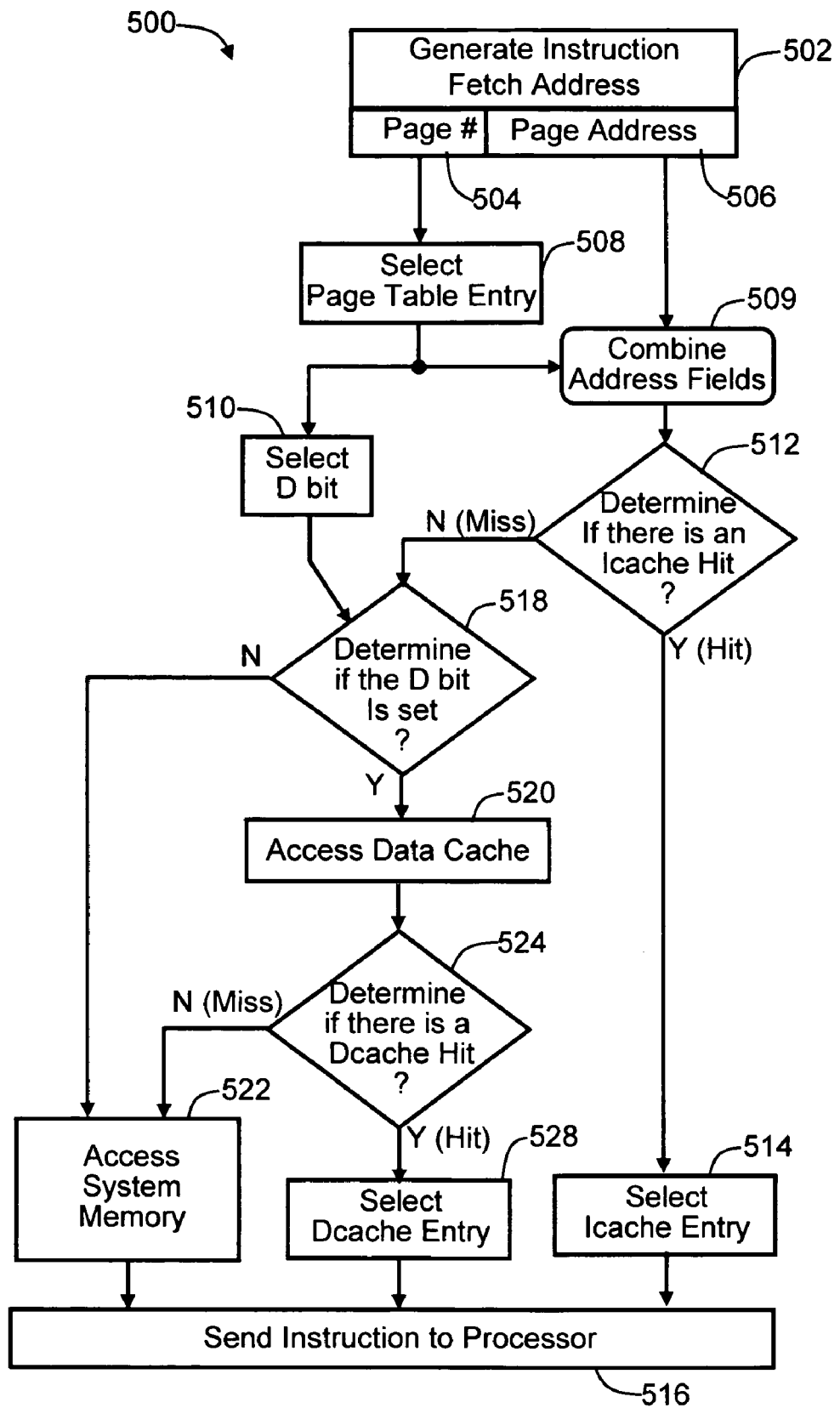
FIG. 5 is a flow chart of an exemplary method for fetching an instruction stored in a data cache in accordance with the present disclosure.

FIG. 5 is an exemplary flow chart of a method 500 for fetching an instruction in a data cache after having a miss in the instruction cache and a check data cache attribute indicates the data cache should be checked for the instruction. Exemplary relationships between the steps of FIG. 5 and the elements of FIG. 4 are indicated by referring to exemplary elements from the processor and memory complex 400 which may suitably be employed to carry out steps of the method 500 of FIG. 5.

In order to fetch an instruction, an instruction fetch address for the desired instruction is generated in step 502. For example, a processor, such as the processor 402 generates an instruction fetch address and sends the instruction fetch address 414 to the L1 instruction cache controller 406. The instruction fetch address may be a virtual address made up of a page number 504 and a page address 506. In step 508, an appropriate entry in an instruction page table, such as instruction page table 416, is selected based on the supplied page number 504. The address generated based on the selected page table entry is combined in step 509 with the page address 506 to produce an instruction cache address.

The entry selected from the instruction page table 416 includes the additional information stored with that entry. One of the additional bits of information that may be stored with each page table entry is a check data cache attribute, such as the bit labeled as the D bit 420. This attribute is selected in step 510.

In step 512, it is determined whether there is an instruction cache hit or a miss. For example, the instruction cache checks to see if the instruction is present. If the instruction is present, its presence is indicated as a hit. If the instruction is present, the method 500 proceeds to step 514 and the instruction at the instruction fetch address is selected. In step 516, the instruction is sent to the processor. For example, the selected instruction is placed on instruction out bus 422 and sent through multiplexing element 438 to the instruction bus 440 of the processor 402.

If the instruction is not present in the instruction cache as determined in step 512, an indication is given that a miss has occurred and the method 500 proceeds to step 518. In step 518, the D bit that was selected in step 510 is checked to see if it is set to a "1" indicating the data cache should be checked for the instruction. If the D bit was set to a "1", the processor attempts to fetch the instruction from the data cache in step 520. For example, the generated instruction fetch address 418 is sent as a data fetch address 434 to the data cache.

In step 524, the data cache checks to see if there is valid data present at the supplied instruction fetch address. If there is valid data present at the supplied instruction fetch address, the data actually is an instruction and the data cache entry is fetched in step 528. In step 516, the data fetched from the data cache is sent as an instruction to the processor. For example, the data fetched on data out bus 436 is sent through multiplexing element 438 and supplied as an instruction to the processor 402 on instruction bus 440.

Returning to step 518, if it is determined in step 518 that the D bit was a "0", it is known that the instruction is not present in the data cache and the method 500 proceeds to step 522. The step 522 is also reached for the situation where there was a miss in the data cache at the supplied instruction fetch address, as determined in step 524. In either case, the instruction is known to not be present in the instruction cache or in the data cache and the instruction is fetched from system memory, as indicated in step 522. For example, system memory 412 will be accessed for the instruction. Once the instruction is obtained from the system memory 412, the instruction is sent to the processor 402, as indicated in step 516.

Figure 6:
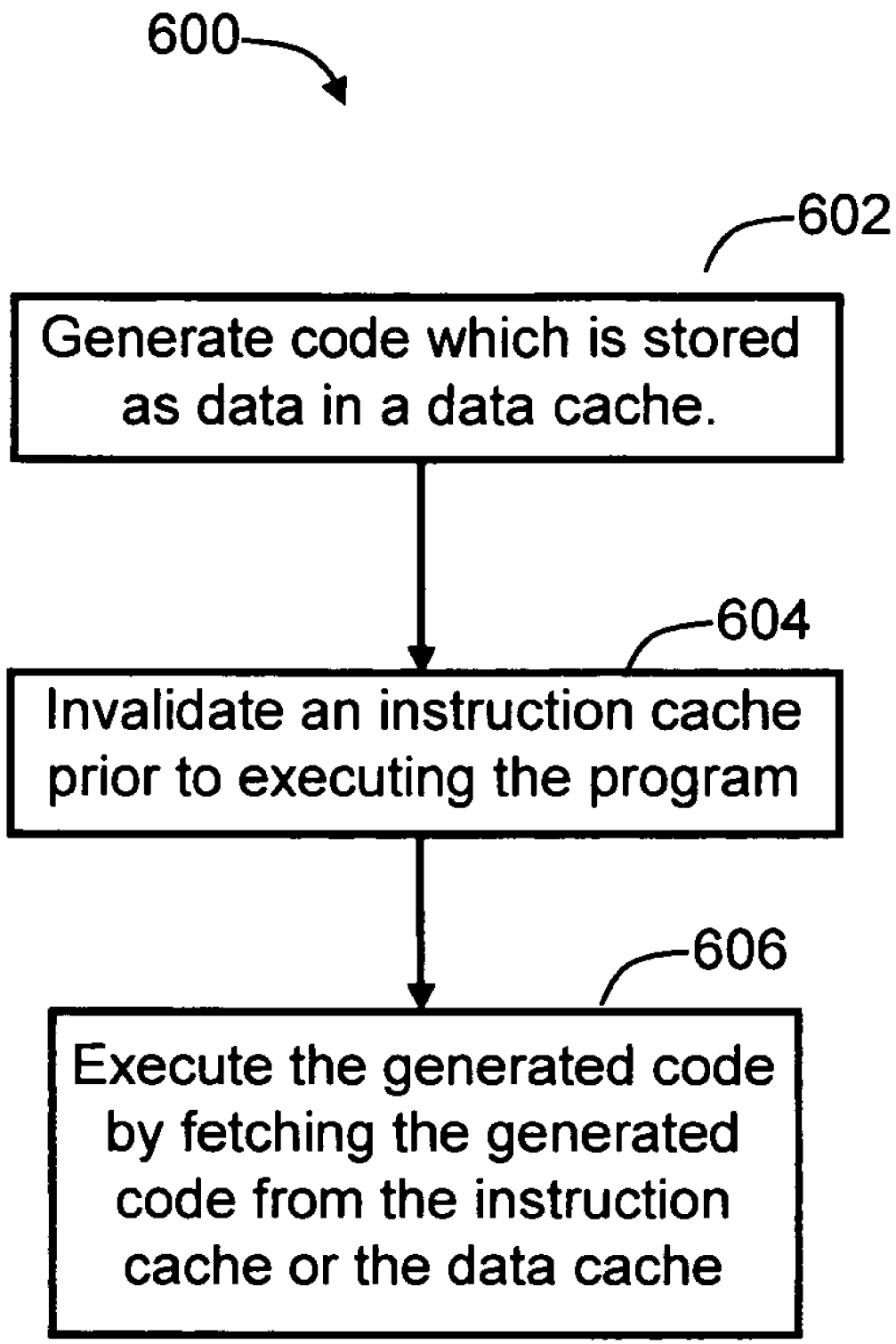
FIG. 6 is a flow chart of an exemplary method for executing code that is generated as data and stored in a data cache in accordance with the present disclosure.

FIG. 6 is an exemplary flow chart of a method 600 for executing program code that is generated as data and stored in a data cache. Program code following this method may be executed on a processor and memory complex having an instruction cache, a data cache, and a system memory, such as, those discussed in connection with FIGS. 2 and 4, and may be suitably employed in components 125A-C of FIG. 1.

In step 602, a program generates code. Such generation may occur, for example, when a program generates executable code from a compressed program. The generated code is initially treated as data and stored in a data cache after it is generated. Prior to executing the program, an instruction cache is invalidated in step 604. The invalidation step ensures there are no instructions at the same address as the generated code. In step 606, the generated code is executed by the processor by fetching instructions from the program address space in the instruction cache and may include instructions that are stored in the data cache. For those instructions stored in the data cache, the techniques of the present disclosure are followed allowing the data cache to be checked for instructions on an occurrence of a miss in the instruction cache. Upon finding an instruction in the data cache, the instruction is directly fetched from the data cache for execution on the processor.

While the present disclosure has been disclosed in a presently preferred context, it will be recognized that the present teachings may be adapted to a variety of contexts consistent with this disclosure and the claims that follow.

We claim:

1. A method of finding an instruction in a data cache that is separate from an instruction cache, the method comprising:
   determining that a fetch attempt at an instruction fetch address in the instruction cache for the instruction was not successful;
   determining that a check data cache attribute has been set to an active state in a page table entry associated with the instruction fetch address;
   selecting the instruction fetch address as a data fetch address in response to the check data cache attribute being in a active state;
   making a fetch attempt in the data cache for the instruction at the selected data fetch address; and
   setting an information present indication to an active state if the instruction was found in the data cache in response to the fetch attempt in the data cache.

2. The method of claim 1 further comprising:
   setting a check data cache attribute active in the associated page table entry when generating instructions that are stored as data in the data cache.

3. The method of claim 1 further comprising:
   generating data by a program whereby the data is to be used as instructions; and
   requesting by the program an operating system to set the check data cache attribute active in at least the associated page table entry.

4. The method of claim 2 wherein the check data cache attribute is cleared for use by a different program.

5. The method of claim 1 wherein the step of selecting the instruction fetch address further comprises:
   multiplexing the instruction fetch address and a data fetch address; and
   selecting the instruction fetch address for application to the data cache as the selected data fetch address, wherein the instruction fetch address is selected after determining that the instruction fetch attempt was not successful in the instruction cache.

6. The method of claim 1 wherein the step of making a fetch attempt in the data cache further comprises:
   determining the instruction was found in the data cache; and
   fetching the instruction from the data cache.

7. The method of claim 1 further comprising:
   determining the fetch attempt in the data cache was not successful; and
   informing an instruction memory control that the fetch attempt in the data cache was not successful.

8. The method of claim 7 further comprising:
   fetching the instruction from a system memory.

9. A processor complex comprising:
   an instruction cache;
   an instruction memory management unit having a page table with entries that have one or more check data cache attributes;
   a data cache; and
   a first selector to select an instruction fetch address or a data fetch address based on a selection signal in response to a check data cache attribute and a status indication of an instruction fetch operation in the instruction cache, the selection signal causing the instruction fetch address or the data fetch address to be applied to the data cache whereby instructions or data may be selectively fetched from the data cache.

10. The processor complex of claim 9 wherein the selection signal of the first selector selects the data fetch address in response to a data access operation.

11. The processor complex of claim 9 wherein the selection signal of the first selector selects the instruction fetch address if the status indication of an instruction fetch operation indicates the instruction was not found in the instruction cache and the check data cache attribute is set to an active state.

12. The processor complex of claim 9 further comprising:
   a second selector to select an instruction out bus from the instruction cache or a data out bus from the data cache to be applied to a processors's instruction bus input.

13. The processor complex of claim 12 wherein the second selector selects the data out bus from the data cache if the status indication of an instruction fetch operation indicates the instruction was not found in the instruction cache, the check data cache attribute is in an active state, and a status indication of a data fetch operation indicates data was found in the data cache at the instruction fetch address selected through the first selector.

14. The processor complex of claim 12 wherein the second selector selects the instruction out bus if the status indication of an instruction fetch operation indicates the instruction was found in the instruction cache.

15. The processor complex of claim 9 further comprising:
a third selector to select a memory out bus from a system memory or a data out bus from the data cache to be applied to an instruction bus input of the instruction cache.

16. The processor complex of claim 15 wherein the third selector selects the data out bus from the data cache if the status indication of an instruction fetch operation indicates the instruction was not found in the instruction cache, the check data cache attribute is in an active state, and a status indication of a data fetch operation indicates data was found in the data cache at the instruction fetch address selected through the first selector.

17. A method for executing program code comprising:
generating instructions that are part of the program code which are stored as data in a data cache;
requesting an operating system to set a check data cache attribute active in at least one page table entry associated with the instructions;
invalidating the instruction cache prior to execution of the program code that uses the generated instructions;
fetching the instructions directly from the data cache in response to active check data cache attributes associated with the instructions if the instructions are not found in the instruction cache; and
executing the program code.

18. The method of claim 17 wherein the generating instructions step includes the operation of loading instructions into the data cache.

19. The method of claim 17 wherein the invalidating the instruction cache further comprises:
invalidating only a portion of the instruction cache at the addresses where the generated instructions are stored.

20. The method of claim 17 wherein the page table is an instruction page table located in a memory management unit.

* * * * *